(12) United States Patent
Riley

(10) Patent No.: US 9,039,895 B1
(45) Date of Patent: May 26, 2015

(54) OIL SPILL CLEAN-UP VESSEL WITH ICE DISPLACEMENT CAPABILITIES

(76) Inventor: Rocky R. Riley, Minto, AK (US)

( * ) Notice: Subject to any disclaimer, the term of this patent is extended or adjusted under 35 U.S.C. 154(b) by 174 days.

(21) Appl. No.: 13/096,992

(22) Filed: Apr. 28, 2011

Related U.S. Application Data

(60) Provisional application No. 61/329,235, filed on Apr. 29, 2010.

(51) Int. Cl.
  *B01D 35/00* (2006.01)
  *E02B 15/04* (2006.01)
  *E02D 17/00* (2006.01)
  *E02B 15/10* (2006.01)

(52) U.S. Cl.
  CPC .............. *E02B 15/103* (2013.01); *E02B 15/10* (2013.01)

(58) Field of Classification Search
  None
  See application file for complete search history.

(56) References Cited

U.S. PATENT DOCUMENTS

| | | | | |
|---|---|---|---|---|
| 3,358,838 A * | 12/1967 | Kosar et al. | ............ | 210/179 |
| 3,610,596 A * | 10/1971 | Snyder | ............ | 432/24 |
| 3,656,624 A * | 4/1972 | Walton | ............ | 210/242.3 |
| 4,039,454 A | 8/1977 | Miller et al. | | |
| 4,511,808 A * | 4/1985 | Jost | ............ | 290/54 |
| 5,102,540 A | 4/1992 | Conradi et al. | | |
| 5,254,266 A | 10/1993 | Barnes et al. | | |
| 5,593,579 A * | 1/1997 | Reynolds | ............ | 210/242.1 |
| 5,792,350 A | 8/1998 | Sorley et al. | | |
| 2006/0266694 A1* | 11/2006 | Broje | ............ | 210/402 |
| 2006/0283795 A1* | 12/2006 | Nurse et al. | ............ | 210/617 |

* cited by examiner

*Primary Examiner* — Nam Nguyen
*Assistant Examiner* — Richard Gurtowski
(74) *Attorney, Agent, or Firm* — Law Office of Karen Dana Oster, LLC

(57) ABSTRACT

An oil spill clean-up apparatus and method, and more specifically to a self-contained oil spill clean-up vessel with ice displacement capabilities. One preferred oil spill clean-up system includes a vessel subsystem, an ice displacement subsystem, and an oil spill skimming subsystem. Preferred oil spill clean-up systems may include at least one storage subsystem. Preferred oil spill clean-up systems may include an oil/water separation and removal subsystem.

17 Claims, 6 Drawing Sheets

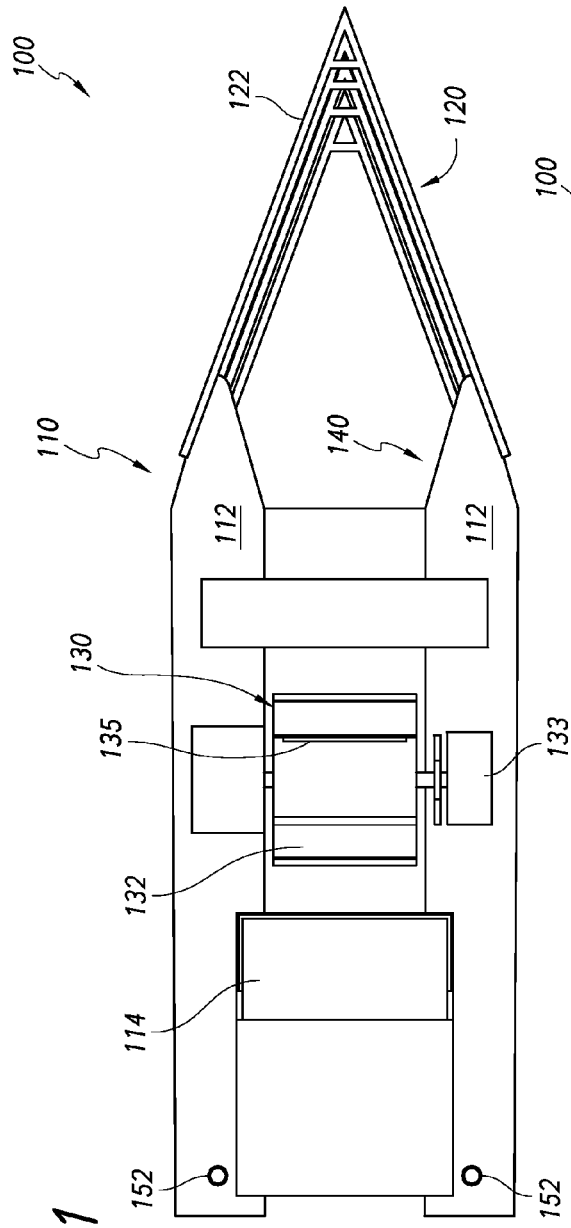
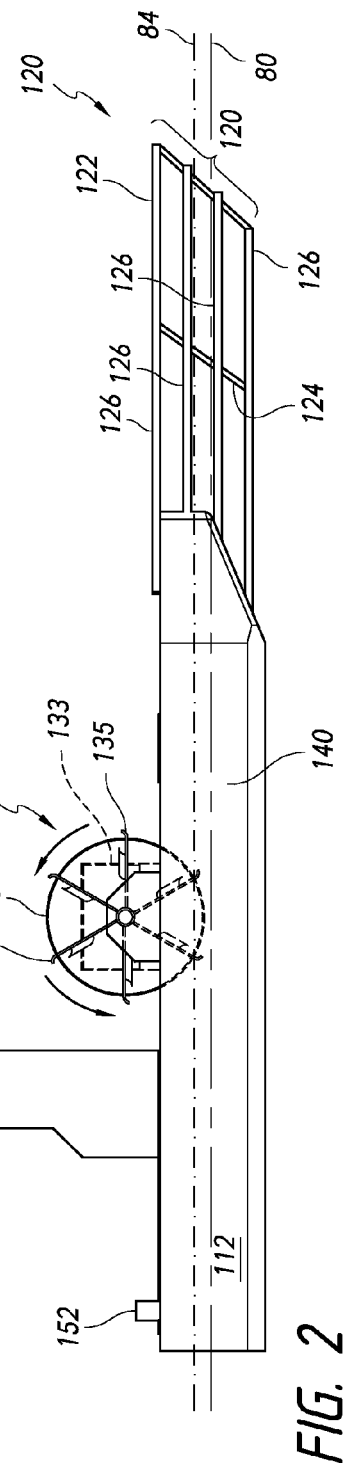

OIL SPILL CLEAN-UP VESSEL WITH ICE DISPLACEMENT CAPABILITIES

The present application is an application claiming the benefit of U.S. Provisional Patent Application Ser. No. 61/329,235, filed Apr. 29, 2010. The present application is based on and claims priority from this application, the disclosure of which is hereby expressly incorporated herein by reference in its entirety.

BACKGROUND OF INVENTION

This disclosure relates to an oil spill clean-up apparatus and method, and more specifically to self-contained oil spill clean-up vessel with ice displacement capabilities.

An ice environment, for purposes of this disclosure, is water that contains free-floating ice in the form of ice chunks or ice particles. The ice chunks and/or ice particles usually float at or near the surface of the water. For purposes of this disclosure, ice chunks are larger than ice particles.

Oil spills in an ice environment pose a unique challenge in comparison to open water oil spills. Current clean-up methods do not provide adequate solutions for addressing oil spills in an ice environment.

There are many references that teach oil spill clean-up systems, but most of these are not useful in waters with ice floating on the surface. Examples of these include:

U.S. Pat. No. 5,102,540 to Conradi et al. (the "Conradi reference");

U.S. Pat. No. 5,254,266 to Barnes et al. (the "Barnes reference"); and

U.S. Pat. No. 5,792,350 to Sorley et al. (the "Sorley reference").

U.S. Pat. No. 4,039,454 to Miller et al. (the "Miller reference") discloses a vessel that is useful in an ice environment. The Miller reference discloses a device for separating, in an ice environment, fluids having differing physical properties which combine an oleophilic pick-up device with a rotating tumbler mechanism which tends to agitate and propel oil coated pieces of ice rearward and along a perforated inclined through-put barrier where oil jarred off the ice chunks is allowed to rise through the perforations and be contained in an area where it can be accumulated and recovered by the pick-up unit.

All publications, patents, and patent applications cited herein, whether supra or infra, are hereby incorporated by reference in their entirety.

BRIEF SUMMARY OF THE INVENTION

This disclosure relates to an oil spill clean-up apparatus and method, and more specifically to self-contained oil spill clean-up vessel with ice displacement capabilities.

One preferred oil spill clean-up system includes a vessel subsystem, an ice displacement subsystem, and an oil spill skimming subsystem. Preferred oil spill clean-up systems may include at least one storage subsystem. Preferred oil spill clean-up systems may include an oil/water separation and removal subsystem.

A vessel subsystem preferably includes at least one pontoon-like float. A preferred vessel subsystem may include two parallel elongate pontoon-like floats that are at least partially hollow.

An ice displacement subsystem preferably includes a grate substantially spanning the front of the vessel subsystem. A preferred ice displacement subsystem may include a grate including at least one grate support and at least one grate bar. One or more grate bar may be maneuverable grate bars.

The oil spill skimming subsystem preferably includes a rotating drum for skimming oil. A preferred oil spill skimming subsystem includes a rotating drum having angled grooves in the surface thereof.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings, which are incorporated in and constitute a part of this specification, illustrate various exemplary clean-up vessels and subsystems and components thereof.

FIG. 1 is a top view of an exemplary self-contained oil spill clean-up vessel with ice displacement capabilities.

FIG. 2 is a side view of an exemplary self-contained oil spill clean-up vessel with ice displacement capabilities.

Figure 3:
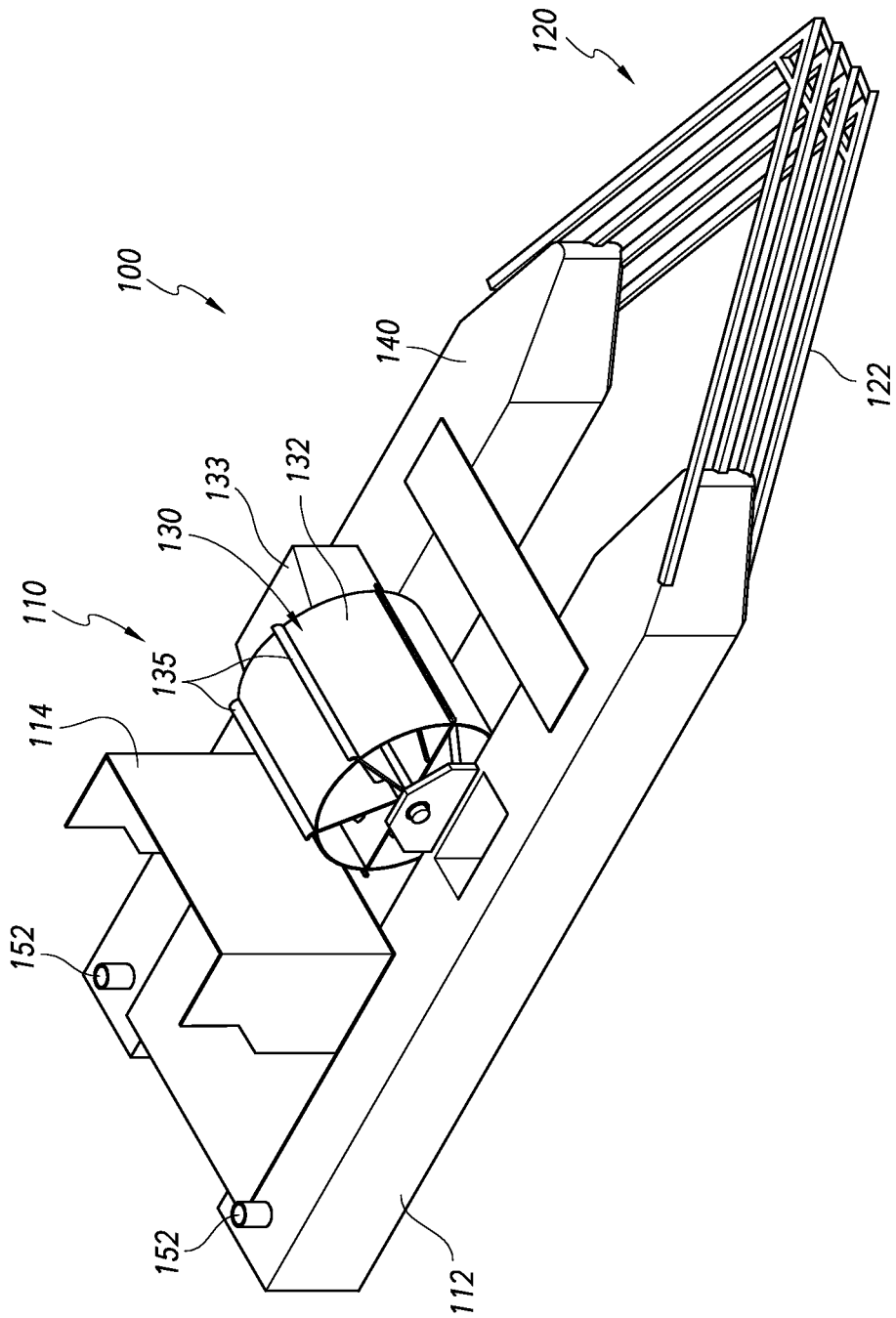
FIG. 3 is a perspective view of an exemplary self-contained oil spill clean-up vessel with ice displacement capabilities.
Figure 4:
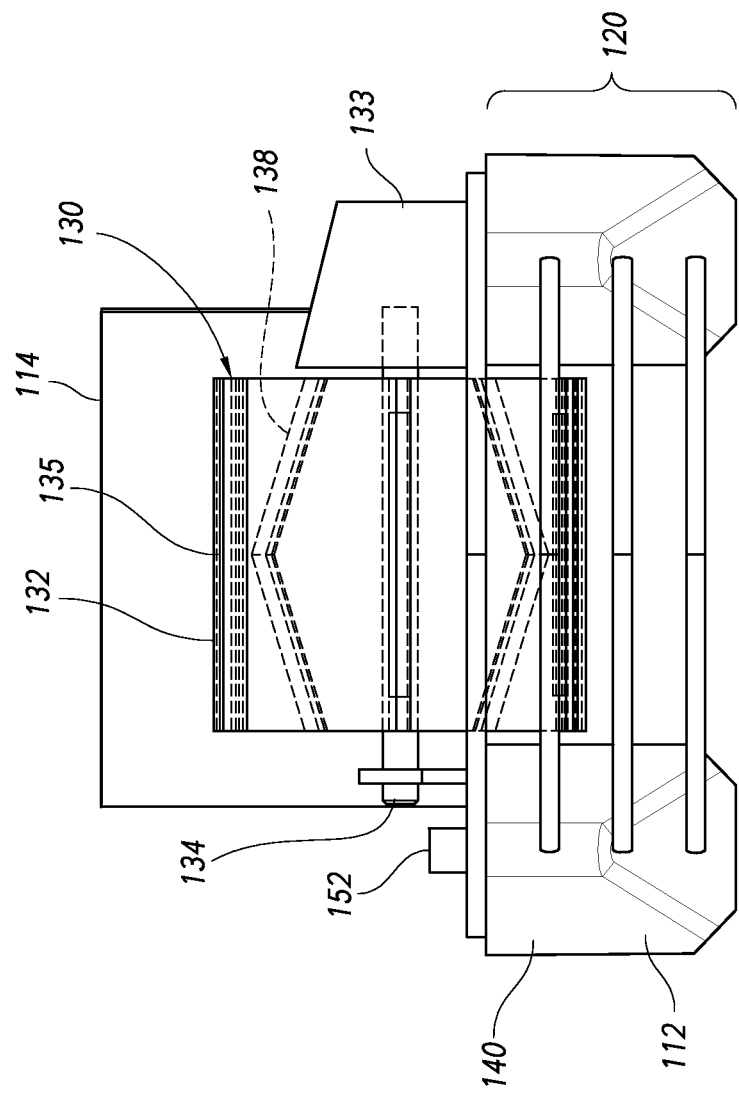
FIG. 4 is a front view of an exemplary self-contained oil spill clean-up vessel with ice displacement capabilities, angled grooves in the surface of the rotating drum being shown in phantom.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Figure 5:
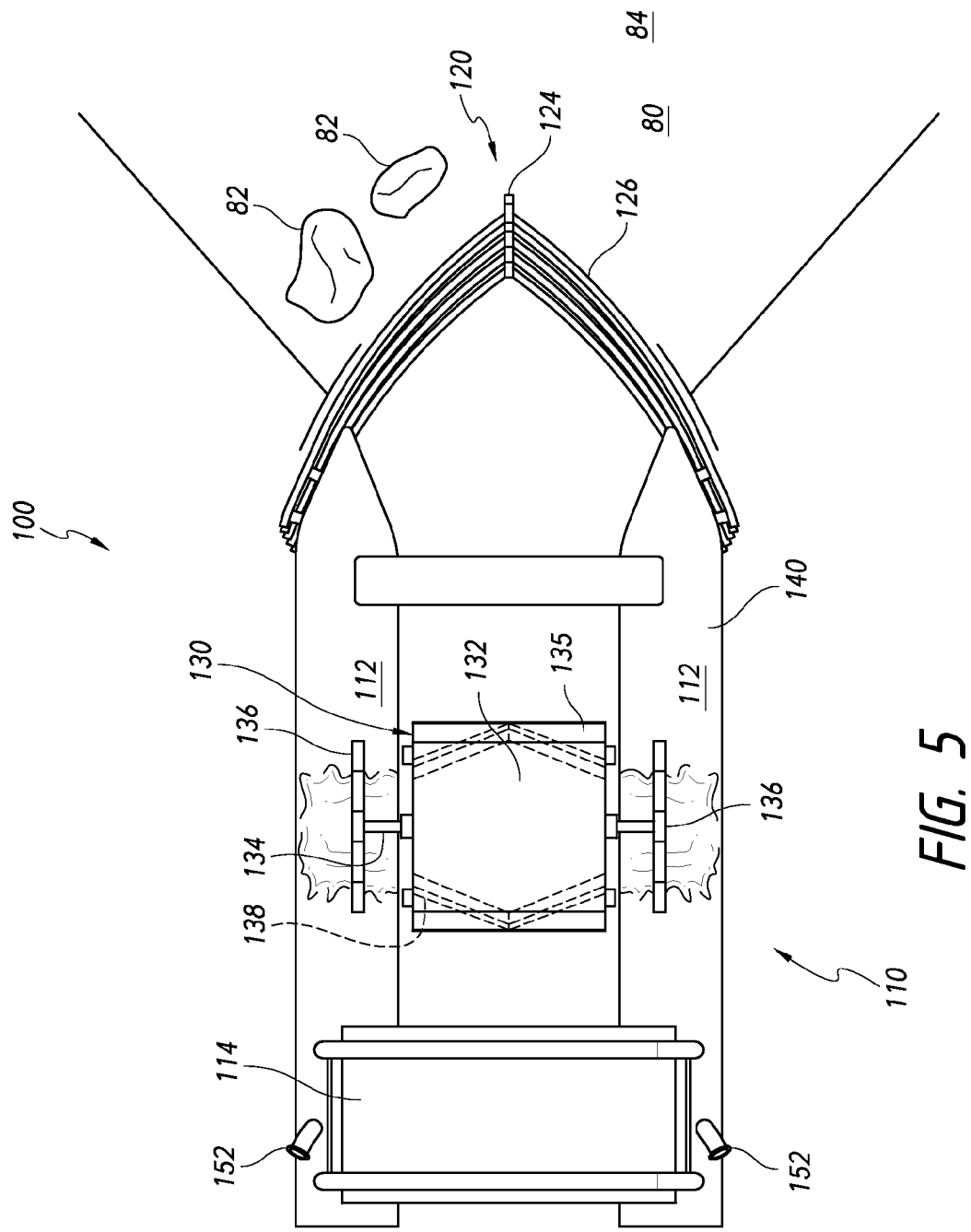
FIG. 5 is a top view of an exemplary self-contained oil spill clean-up vessel with ice displacement capabilities displacing ice, angled grooves in the surface of the rotating drum being shown in phantom.
Figure 6:
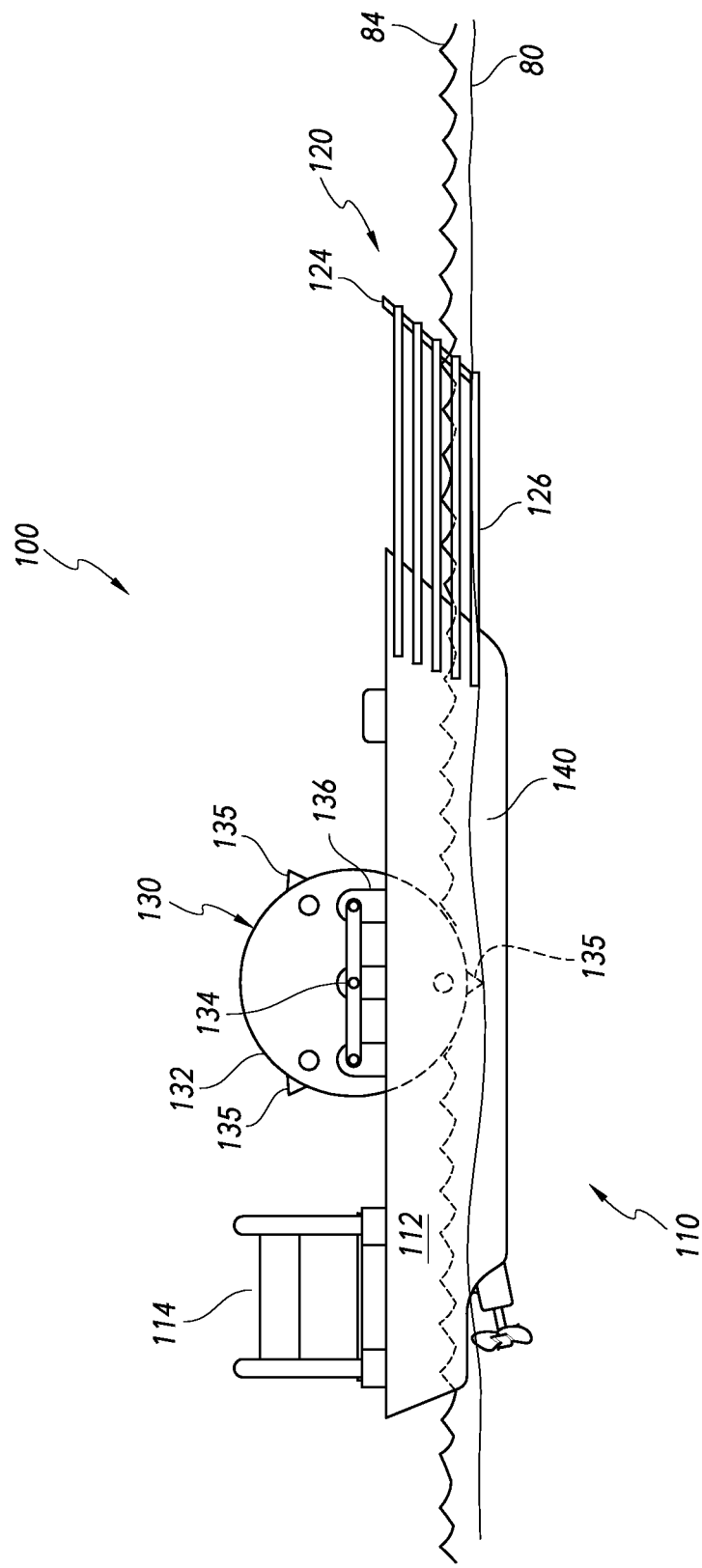
FIG. 6 is a side view of an exemplary self-contained oil spill clean-up vessel with ice displacement capabilities displacing ice.
Figure 7:
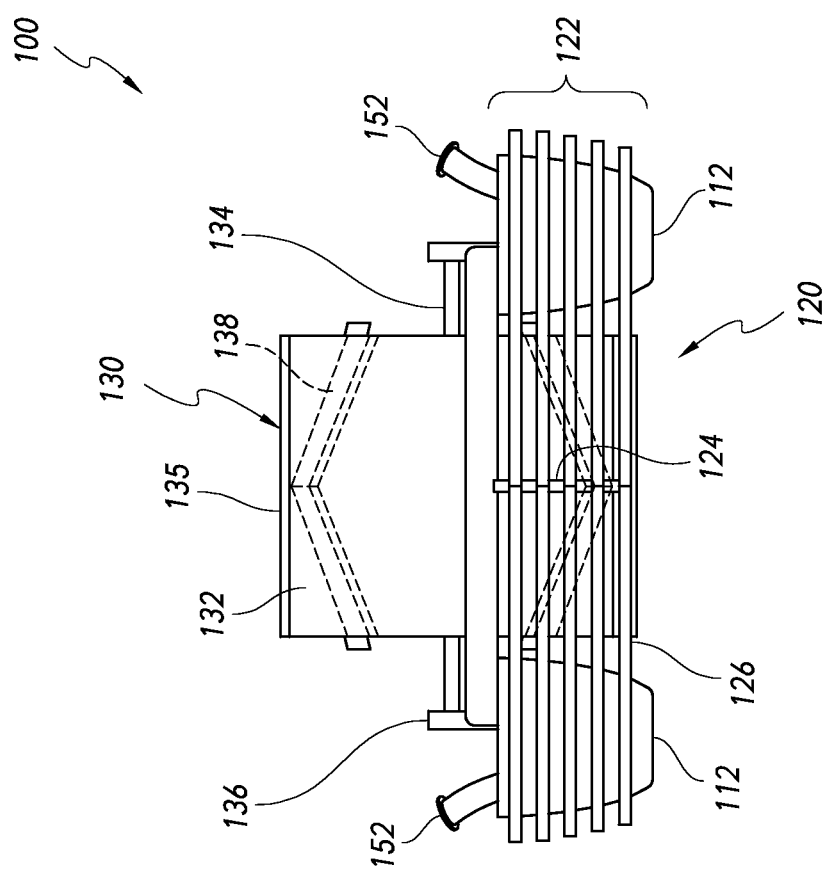
FIG. 7 is a front view of an exemplary self-contained oil spill clean-up vessel with ice displacement capabilities displacing ice, angled grooves in the surface of the rotating drum being shown in phantom.

As mentioned, an ice environment, for purposes of this disclosure, is water 80 that contains free-floating ice 82 (FIG. 5) in the form of ice chunks or ice particles. Oil spills in an ice environment pose a unique challenge in comparison to open water oil spills. The oil spill clean-up apparatus and method (hereinafter referred to jointly as the "clean-up system") embodied in the exemplary self-contained oil spill clean-up vessel 100 with ice displacement capabilities (hereinafter referred to as the "clean-up vessel 100") incorporating the clean-up system described herein satisfactorily addresses and solves the challenge associated with oil spills in an ice environment. Unlike prior art devices that were not capable of dealing with the free-floating ice 82, preferred clean-up systems described herein are specifically designed to address the free-floating ice 82. Unlike prior art devices that were designed to actively engage and clean free-floating ice 82, preferred clean-up systems described herein are designed to gently displace the free-floating ice 82 while the vessel 100 is propelled forward so that the oil 84 in the water 80 over which the vessel 100 travels can be separated from the water 80 and removed.

For purposes of discussion, the self-contained oil spill clean-up vessel 100 with ice displacement capabilities can be divided into five primary subsystems, some of which overlap:
1. a vessel subsystem 110;
2. an ice displacement subsystem 120 (shown as a grate 122 substantially spanning the front of the vessel 110);
3. an oil spill skimming subsystem 130 (shown as including a rotating drum 132);
4. at least one storage subsystem 140; and
5. an oil/water separation and removal subsystem 150.

The vessel subsystem 110 is preferably any floating vessel. In the shown preferred embodiment, the vessel is a vessel having two parallel elongate pontoon-like floats 112 that are at least partially hollow. The vessel subsystem 110 preferably includes an operator cab 114 that may be positioned either before or after the oil spill skimming subsystem 130 (e.g. in the front or rear of the vessel). A front location is ideal for purposes of avoiding splashing of oil from the rotating drum 132 and monitoring the hydraulic grate system 122. Alternatively, the operator cab 114 can be located in the rear of the vessel for purposes of monitoring the oil spill skimming subsystem 130 (including rotating drum 132). The vessel subsystem 110 would include means for propelling the vessel through the water. Exemplary propulsion means could include any known means including, but not limited to a propeller, sails, a motor, and any other means for propulsion known or yet to be discovered.

The ice displacement subsystem 120 is preferably a unique pointed or curved grate 122 that at least substantially spans the front of the vessel 110. The grate 122 is used for displacing free-floating ice from the vessel's traveling path while allowing liquid (oil/water) to pass through to the oil spill skimming subsystem 130. Preferably the grate 122 includes at least one grate support 124 and a plurality (shown as four) of maneuverable grate bars 126 (shown as substantially horizontal) that are vertically adjustable along the length of the grate support(s). The grate bars 126 are vertically (in relation to the surface of the water—so "up and down") adjustable to properly displace free-floating ice on the surface of the water while allowing liquid (oil/water) to pass through to the oil spill skimming subsystem 130. The grate bars 126 are vertically adjustable so that one bar is above the surface of the oil line and the next (adjacent bar) is below the surface of the water line, the space between the two bars also may be dependent on size of free-floating ice and the capabilities of the oil spill skimming subsystem 130.

The grate bars 126 shall be adjustable to properly displace free-floating ice on the surface of the water. The grate bars 126 are individually and collectively controllable to maintain adequate separation, (e.g. three to four inches) between grate bars 126 at the surface of the water. The movement of the maneuverable grate bar(s) 126 may be controlled manually or automatically by a maneuverable grate bars control subsystem (not shown) that may consist of sensors (not shown) positioned on the grate (or near the grate) and a processor controlled by a program stored on processor-readable media (e.g. computer-readable memory). The sensors would be used to detect the position of the bars 126 relative to the oil, water, top of the ice, and/or bottom of the ice. The maneuverable grate bars control subsystem program would use the information provided by the sensors to determine which bars 126 needed to be raised and which bars needed to be lowered. The maneuverable grate bars 126 may be movable jointly, individually, or a combination thereof. The maneuverable grate bars 126 may be movable manually or may be movable powered by power means such as hydraulic mechanisms.

One example of how the maneuverable grate bars 126 control subsystem may be used in the clean-up system is to adjust the position of the grate bars 126 to compensate for the descension (or accession) of the clean-up vessel 100 as the storage subsystem 140 fills with liquid (oil and/or water) which may result in a descension of the vessel 100. When the storage subsystem 140 fills and the clean-up vessel 100 settles deeper in the water, the sensors of the maneuverable grate bars 126 control subsystem sense the descension and the program of the maneuverable grate bars control subsystem moves the grate bars 126 to compensate for the descension.

The oil spill skimming subsystem 130 is preferably a unique rotating drum 132 (cylinder) for skimming oil off the surface of the water in the vessel's traveling path. Preferably the oil spill skimming subsystem 130 includes a rotating drum 132 and a drum support (shown as two drum supports, one on each side of the drum 132). The rotating drum 132 has a central axis around which the rotating drum 132 rotates. At both ends of the axis is an axle 134 (that may be a single unit spanning the axis or may be separate mechanisms attached to the drum 132 on either side thereof). In the shown oil spill skimming subsystem 130, the drum axles engage respective drum supports 136 (shown as a spanning member and two upright members) and are vertically adjustable in relation thereto. The drum axles rotate within the spanning member. Each shown spanning member of the drum supports is supported in two places (shown at either end) by their respective upright members. The spanning member is vertically adjustable in relation to the upright members. As the drum axles are associated with the spanning member, the drum axle (and the rotating drum) is also vertically adjustable in relation to the upright members.

The rotating drum 132 uses gravity to isolate the oil 84 from the water 80 and transfer the oil 84 to the storage subsystem 140. As the vessel navigates through the oil-laden water, the rotating drum 132 skims the surface of the water lifting the oil. The rotation of the rotating drum 132 lifts the oil 84 to the top of the rotating drum 132 where the oil is gravity-fed (via a trough, pipe, or other transfer mechanism) to the storage subsystem 140 for storage. Preferably the rotating drum 132 is powered by power means such as hydraulic mechanisms (shown as a hydraulic chain driven axle 133 in FIG. 1).

As shown in FIGS. 4-7, the rotating drum 132 may have angled grooves 138 in the surface thereof. In the shown embodiment the grooves 138 are positioned near the surface at the center of the drum 132, but are angled away toward the center axle as the grooves 138 near the outer periphery of the drum 132. This configuration allows the oil skimmed and lifted by the rotating drum 132 to travel the shortest path downward (pulled by gravity) away from the center of the drum 132 to the storage subsystem 140. Oil is gravity fed to chutes and spills into the pontoon-like floats 112 of the storage subsystem 140. The surface of the rotating drum 132 may also include bars or troughs (shown as 135 in FIGS. 2, 6, and 7) that assist in the skimming process.

An alternative preferred oil spill skimming subsystem 130 may be a skimmer that scrapes oil off the surface of the water.

The ability to vertically adjust the position of the oil spill skimming subsystem 130 allows the lower skimming section thereof to be properly positioned in relation to the oil and/or water. The movement of the oil spill skimming subsystem 130 may be controlled manually or automatically by a oil spill skimming subsystem 130 control subsystem that may consist of sensors positioned on the oil spill skimming subsystem 130

(or near the oil spill skimming subsystem 130) and a processor controlled by a program stored on processor-readable media (e.g. computer-readable memory). The sensors would be used to detect the position of the oil spill skimming subsystem 130 relative to the oil, water, top of the ice, and/or bottom of the ice. The oil spill skimming subsystem program would use the information provided by the sensors to determine whether the oil spill skimming subsystem 130 needed to be lowered. The oil spill skimming subsystem 130 may be movable manually or may be powered by power means such as hydraulic mechanisms.

One example of how the oil spill skimming subsystem 130 may be used in the clean-up system is to adjust the position of the oil spill skimming subsystem 130 to compensate for the descension (or accession) of the clean-up vessel 100 as the storage subsystem 140 fills with liquid (oil and/or water) which may result in a descension of the vessel. When the storage subsystem 140 fills and the clean-up vessel 100 settles deeper in the water, the sensors of the oil spill skimming subsystem control subsystem sense the descension and the program of the oil spill skimming subsystem control subsystem moves the oil spill skimming subsystem 130 to compensate for the descension.

The storage subsystem 140 is preferably the two parallel elongate pontoon-like floats 112 (that are at least partially hollow) of the vessel subsystem 110.

The oil/water separation and removal subsystem 150 is preferably a combination of the natural separation properties of oil/water and the mechanical removal of the separated water from the storage subsystem 140. The liquid isolated by the skimming subsystem consists of a mixture of oil 84 and water 80. This mixture will separate based on the inherent chemical composition of the oil and water so that a layer of oil 84 will collect on the surface of the water 80 within the storage subsystem 140. In the shown embodiment, each float of the storage subsystem 140 is equipped with access points 152 (shown as an access point and/or comlock oil discharge pipe) to facilitate removal of isolated liquids. Removal can be accomplished by pumping the water layer, situated on the bottom of the storage subsystem 140, back into the body of water. Similarly, the oil layer can be pumped or siphoned to a following vessel.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

It is to be understood that the inventions, examples, and embodiments described herein are not limited to particularly exemplified materials, methods, and/or structures.

The descriptions and applications herein are not to be construed as limiting the invention, but as examples and illustrations of the invention.

It should be noted that some terms used in this specification are meant to be relative. For example, the terms "horizontal" and "vertical" are meant to be relative, the terms "front" and "back" are meant to be relative, and the terms "top" and "bottom" are meant to be relative.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the term "includes" means "comprises" (e.g. a device that includes or comprises A and B contains A and B but optionally may contain C or additional components other than A and B). It should be noted that, unless otherwise specified, the singular forms "a," "an," and "the" refer to one or more than one, unless the context clearly dictates otherwise.

All publications, patents, and patent applications cited herein, whether supra or infra, are hereby incorporated by reference in their entirety.

The terms and expressions that have been employed in the foregoing specification are used as terms of description and not of limitation, and are not intended to exclude equivalents of the features shown and described. This application is intended to cover any adaptations or variations of the present invention. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention which, as a matter of language, might be said to fall therebetween.

What is claimed is:

1. An oil clean-up system comprising:
   (a) a vessel subsystem having a front and a back, said vessel subsystem including at least one at least partially hollow float;
   (b) an ice displacement subsystem positioned to displace free-floating ice from said vessel subsystem's traveling path through the surface of water as said vessel subsystem is propelled forward, said ice displacement subsystem associated with said front of said vessel subsystem;
   (c) an oil spill skimming subsystem;
   (d) at least one storage subsystem; and
   (e) an oil/water separation and removal subsystem;
   wherein said oil spill skimming subsystem includes a rotating drum for skimming oil, said rotating drum having two outer periphery ends and a center positioned midway between said two outer periphery ends, said rotating drum having a center axle and an outer surface, said rotating drum having angled grooves in the surface thereof, said angled grooves angled to be near said surface at said center of said rotating drum and toward said center axle at said two outer periphery ends, said angled grooves directing oil flow away from said center of said rotating drum, toward said two outer periphery ends, and to said at least one storage subsystem.

2. The oil clean-up system of claim 1 wherein said ice displacement subsystem includes a grate, said grate comprising at least one grate support and at least one maneuverable grate bar, said at least one maneuverable grate bar vertically adjustable along said at least one at least one grate support so that said at least one maneuverable grate bar moves vertically up and down in relation to the surface of the water upon which said vessel subsystem floats.

3. The oil clean-up system of claim 1, said ice displacement subsystem comprising:
   (a) a grate comprising a plurality of grate supports and a plurality of maneuverable grate bars;
   (b) a maneuverable grate bars control subsystem;
   (c) at least one sensor, wherein the at least one sensor detects the position of the grate bars relative to the oil, water, or ice; and (d) at least one power means for moving at least one of said maneuverable grate bars in response to said maneuverable grate bars control subsystem when said at least one sensor provides a signal;

(e) wherein said at least one of said maneuverable grate bars is moveable vertically up and down in relation to the surface of the water upon which said vessel subsystem floats.

4. An oil clean-up system comprising:

(a) a vessel subsystem, said vessel subsystem including two parallel elongate pontoon-like floats that are at least partially hollow; and (b) an oil spill skimming subsystem, said oil spill skimming subsystem includes a rotating drum for skimming oil, said rotating drum having two outer periphery ends and a center positioned midway between said two outer periphery ends, said rotating drum having a center axle and an outer surface, said rotating drum having angled grooves in the surface thereof, said angled grooves angled to direct oil skimmed and lifted by said rotating drum toward at least one storage subsystem positioned near at least one of said two outer periphery ends, said angled grooves directing oil flow away from said center of said rotating drum, toward said two outer periphery ends, and to said at least one storage subsystem.

5. An oil clean-up system comprising:

(a) a vessel subsystem, said vessel subsystem including two parallel elongate pontoon-like floats that are at least partially hollow;

(b) an ice displacement subsystem positioned to displace free-floating ice from said vessel subsystem's traveling path through the surface of water as said vessel subsystem is propelled forward, said ice displacement subsystem including a grate generally spanning a front of the vessel subsystem;

(c) an oil spill skimming subsystem, said oil spill skimming subsystem includes a rotating drum for skimming oil, said rotating drum having two outer periphery ends and a center positioned midway between said two outer periphery ends, said rotating drum having a center axle and an outer surface, said rotating drum having angled grooves in the surface thereof, said angled grooves angled to be near said surface at said center of said rotating drum and toward said center axle at said two outer periphery ends; and (d) at least one storage subsystem, said angled grooves angled to direct the flow of oil skimmed and lifted by said rotating drum toward said at least one storage subsystem positioned near at least one of said two outer periphery ends.

6. The oil clean-up system of claim 4 further comprising an ice displacement subsystem, said ice displacement subsystem including a grate, said grate comprising at least one grate support and at least one maneuverable grate bar, said at least one maneuverable grate bar is moveable vertically up and down in relation to the surface of the water upon which said vessel subsystem floats.

7. The oil clean-up system of claim 4 further comprising an ice displacement subsystem, said ice displacement subsystem comprising:

(a) a grate comprising a plurality of grate supports and a plurality of maneuverable grate bars;

(b) a maneuverable grate bars control subsystem;

(c) at least one sensor, wherein the at least one sensor detects the position of the grate bars relative to the oil, water, or ice; and (d) at least one power means for moving at least one of said maneuverable grate bars in response to said maneuverable grate bars control subsystem when said at least one sensor provides a signal;

(e) wherein said at least one of said maneuverable grate bars is moveable vertically up and down in relation to the surface of the water upon which said vessel subsystem floats.

8. The oil clean-up system of claim 5 wherein said ice displacement subsystem includes a grate, said grate comprising at least one grate support and at least one maneuverable grate bar, said at least one maneuverable grate bar is moveable vertically up and down in relation to the surface of the water upon which said vessel subsystem floats.

9. The oil clean-up system of claim 5, said ice displacement subsystem comprising:

(a) a grate comprising a plurality of grate supports and a plurality of maneuverable grate bars;

(b) maneuverable grate bars control subsystem;

(c) at least one sensor, wherein the at least one sensor detects the position of the grate bars relative to the oil, water, or ice; and (d) at least one power means for moving at least one of said maneuverable grate bars in response to said maneuverable grate bars control subsystem when said at least one sensor provides a signal;

(e) wherein said at least one of said maneuverable grate bars is moveable vertically up and down in relation to the surface of the water upon which said vessel subsystem floats.

10. The oil clean-up system of claim 1 wherein said oil spill skimming subsystem includes a rotating drum for skimming oil, said rotating drum having two outer periphery ends and a center positioned midway between said two outer periphery ends, said rotating drum having a center axle and an outer surface, said rotating drum having angled grooves in the surface thereof, said angled grooves angled to direct the flow of oil skimmed and lifted by the rotating drum toward said at least one storage subsystem positioned near at least one of said two outer periphery ends.

11. The oil clean-up system of claim 4, said angled grooves angled to be near said surface at said center of said rotating drum and toward said center axle at said two outer periphery ends.

12. The oil clean-up system of claim 4, wherein said at least one storage subsystem is at least one of said two parallel elongate pontoon-like floats.

13. The oil clean-up system of claim 5, said angled grooves angled to be near said surface at said center of said rotating drum and toward said center axle at said two outer periphery ends.

14. The oil clean-up system of claim 5, wherein said at least one storage subsystem is at least one of said two parallel elongate pontoon-like floats.

15. The oil clean-up system of claim 1, said oil spill skimming subsystem including a rotating drum for skimming oil, said rotating drum rotating about an axle, a pair of drum supports, said axle being supported at both ends by one of said pair of drum supports, said axle and said rotating drum being vertically adjustable in relation to said pair of drum supports.

16. The oil clean-up system of claim 4, said oil spill skimming subsystem including a rotating drum for skimming oil, said rotating drum rotating about an axle, a pair of drum supports, said axle being supported at both ends by one of said pair of drum supports, said axle and said rotating drum being vertically adjustable in relation to said pair of drum supports.

17. The oil clean-up system of claim 5, said oil spill skimming subsystem including a rotating drum for skimming oil, said rotating drum rotating about an axle, a pair of drum supports, said axle being supported at both ends by one of said pair of drum supports, said axle and said rotating drum being vertically adjustable in relation to said pair of drum supports.

\* \* \* \* \*